US012434063B2

(12) United States Patent
Bonde

(10) Patent No.: US 12,434,063 B2
(45) Date of Patent: Oct. 7, 2025

(54) LEADFREE MULTI-SITE BIOELECTRONIC STIMULATOR SYSTEM

(71) Applicant: YALE UNIVERSITY, New Haven, CT (US)

(72) Inventor: Pramod Bonde, Woodbridge, CT (US)

(73) Assignee: YALE UNIVERSITY, New Haven, CT (US)

( * ) Notice: Subject to any disclaimer, the term of this patent is extended or adjusted under 35 U.S.C. 154(b) by 461 days.

(21) Appl. No.: 17/581,345

(22) Filed: Jan. 21, 2022

(65) Prior Publication Data

US 2022/0226660 A1 Jul. 21, 2022

Related U.S. Application Data

(60) Provisional application No. 63/139,972, filed on Jan. 21, 2021.

(51) Int. Cl.
*A61N 1/375* (2006.01)
*A61N 1/05* (2006.01)
(Continued)

(52) U.S. Cl.
CPC ....... *A61N 1/3756* (2013.01); *A61N 1/36135* (2013.01); *A61N 1/37205* (2013.01); *A61N 1/37223* (2013.01)

(58) Field of Classification Search
CPC .............. A61N 1/3756; A61N 1/36135; A61N 1/37205; A61N 1/37223; A61N 1/0534;
(Continued)

(56) References Cited

U.S. PATENT DOCUMENTS

| 10,653,888 B2 * | 5/2020 | Oron ................... A61N 1/37205 |
| 2005/0149170 A1 * | 7/2005 | Tassel .................... A61B 5/028 623/1.15 |

(Continued)

FOREIGN PATENT DOCUMENTS

WO WO-2013035092 A2 * 3/2013 ........... A61B 5/0215

OTHER PUBLICATIONS

Besnoff et al., "High Data-Rate Communication in Near-Field RFID and Wireless Power Using Higher Order Modulation", IEEE Transactions on Microwave Theory and Techniques, vol. 64, No. 2 (Jan. 20, 2016), pp. 401-413.

(Continued)

*Primary Examiner* — Brian T Gedeon
(74) *Attorney, Agent, or Firm* — Riverside Law LLP

(57) ABSTRACT

A leadless multi-site stimulator system comprises a transmit stimulator device comprising a first radially expandable stent structure, a battery electrically coupled to at least one transmit stimulator electrode, a wireless transmit coil comprising the first radially expandable stent structure, and at least one transmit stimulator electronic circuit configured to transmit a stimulation signal, and at least one receive stimulator device comprising a second radially expandable stent structure, at least one receive stimulator electrode, a wireless receive coil comprising the second radially expandable stent structure, and at least one receive stimulator electronic circuit configured to receive a stimulation signal generated from the at least one transmit stimulator electronic circuit. Methods of operating and implanting the system are also disclosed.

15 Claims, 21 Drawing Sheets

(51) Int. Cl.
　　　*A61N 1/36*　　　(2006.01)
　　　*A61N 1/362*　　　(2006.01)
　　　*A61N 1/372*　　　(2006.01)
(58) Field of Classification Search
　　　CPC .. A61N 1/0558; A61N 1/057; A61N 1/36053;
　　　　　　　　　　　　　　　A61N 1/362; A61N 1/37518
　　　See application file for complete search history.

(56) References Cited

U.S. PATENT DOCUMENTS

| | | | | |
|---|---|---|---|---|
| 2007/0093875 | A1* | 4/2007 | Chavan | A61N 1/3787 607/46 |
| 2007/0150009 | A1* | 6/2007 | Kveen | A61F 2/88 607/9 |
| 2015/0355996 | A1* | 12/2015 | Smith | G06F 9/461 717/128 |
| 2016/0235999 | A1* | 8/2016 | Nuta | A61N 1/3756 |

OTHER PUBLICATIONS

Bouwmeester et al., "Quantification of Pulsed Operation of Rotary Left Ventricular Assist Devices with Wave Intensity Analysis", ASAIO Journal, vol. 65, No. 4 (May 2019), pp. 324-330.

Bouwmeester et al., "Wave Intensity Analysis of Right Ventricular Function during Pulsed Operation of Rotary Left Ventricular Assist Devices", ASAIO Journal, vol. 65, No. 5 (Jul. 2019), pp. 465-472.

Christ, A., et al., 'Evaluation of Wireless Resonant Power Transfer Systems With Human Electromagnetic Exposure Limits,' IEEE Transactions on Electromagnetic Compatibility 55(2):265-274, Apr. 2013.

European Heart Rhythm Association, et al, "2012 EHRA/HRS expert consensus statement on cardiac jesynchronization therapy in heart failure: implant and follow-up recommendations and management", Heart Rhythm, vol. 9, No. 9 (Sep. 2012), pp. 1524-1576.

Goodrich et al., "Refinement of an anesthesia protocol for a porcine model for a Free-D powered ventricular assist device", Journal of Investigative Surgery, vol. 28 (2015), p. 60.

Hisiao et al., "Hemodynamic behavior of coronary stents in straight and curved arteries", Current Nanoscience, vol. 10, No. 2, pp. 205-211.

Kirkfeldt et al., "Complications after cardiac implantable electronic device implantations: an analysis of a complete, nationwide cohort in Denmark." European Heart Journal, vol. 35, No. 18 (Dec. 17, 2013), pp. 1186-1194.

Lyu et al., "Synchronized Biventricular Heart Pacing in a Closedchest Porcine Model based on Wirelessly Powered Leadless Pacemakers", Scientific Reports, vol. 10, No. 1 (Feb. 7, 2020), 2067.

Sample et al., 'Analysis, Experimental Results, and Range Adaptation of Magnetically Coupled Resonators for Wireless Power Transfer,' IEEE Transactions on Industrial Electronics, 2011, 58(2):544-554.

Sample et al., "Enabling Seamless Wireless Power Delivery in Dynamic Environments", Proceedings of the IEEE, vol. 101, No. 6 (Apr. 4, 2013), pp. 1343-1358.

Shi & Smith, "Large Area Wireless Power via a Planar Array of Coupled Resonators", Ieee International Workshop on Antenna Technology (IWAT) (Feb. 1, 2016), pp. 200-203.

Sideris et al., "Leadless Cardiac Pacemakers: Current status of a modern approach in pacing", Hellenic Society of Cardiology, vol. 58, No. 6 (May 18, 2017), pp. 403-410.

Smith et al., 'Innovative Free-Range Resonant Electrical Energy Delivery System (Free-D System) for a Ventricular Assist Device Using Wireless Power,' ASAIO J., 2014, 60(1):31-37 (Abstract only).

Tjong and Reddy, "Permanent Leadless Cardiac Pacemaker Therapy: A Comprehensive Review", Circulation, vol. 135, No. 15 (Apr. 11, 2017), pp. 1458-1470.

Udo et al., "Incidence and predictors of short-and longterm complications in pacemaker therapy: the Followpace study", Heart Rythm, vol. 9, No. 5 (May 1, 2012), pp. 728-735.

Wang et al., "Energy Transmission and Power Sources for Mechanical Circulatory Support Devices to Achieve Total Implantability", Annals of Thoracic Surgery, vol. 97, No. 4 (Apr. 2014), pp. 1467-1474.

Waters et al., "Adaptive Impedance Matching for Magnetically Coupled Resonators", Progress in Electromagnetics Research Symposium Proceedings (Aug. 19, 2012), pp. 694-701.

Waters et al., "Electrical power to run ventricular assist devices using the Free-range Resonant Electrical Energy Delivery system", Journal of Heart & Lung Transplantation, vol. 37, No. 12 (Dec. 1, 2018), pp. 1467-1474.

Zhao et al., "NFC-WISP: A Sensing and Computationally Enhanced Near-Field RFID Platform", IEEE International Conference on RFID (2015), pp. 174-181.

* cited by examiner

Self-inductance of TX and RX stents

Quality factor of TX and RX stents

Self-resistance of TX and RX stents

Reflection coefficients S11, S22 and transmission coefficient S12

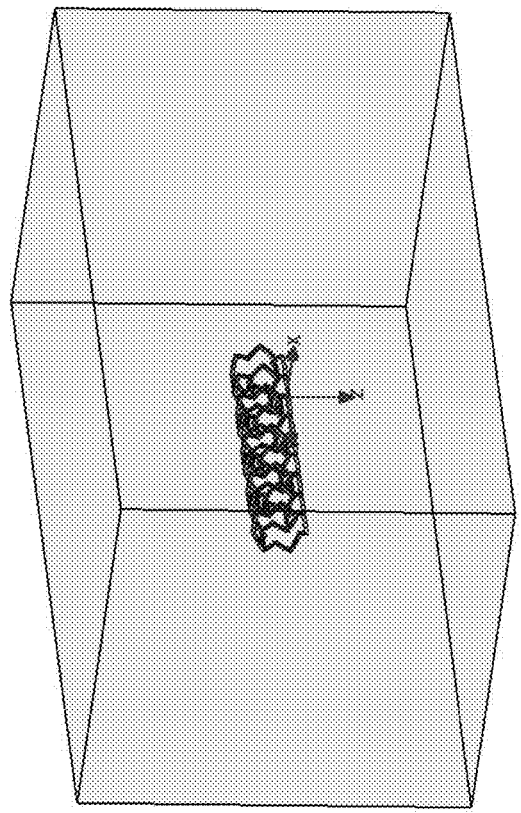
Figure 19
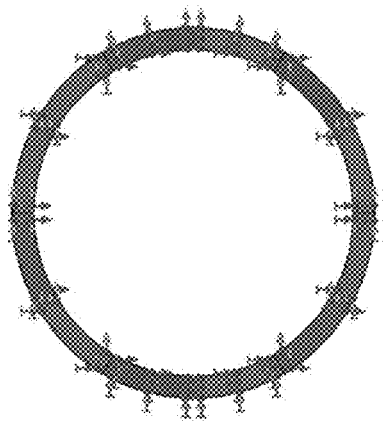
Figure 20

LEADFREE MULTI-SITE BIOELECTRONIC STIMULATOR SYSTEM

CROSS-REFERENCE TO RELATED APPLICATIONS

This application claims priority to U.S. provisional application No. 63/139,972, filed Jan. 21, 2021 incorporated herein by reference in its entirety.

BACKGROUND

Bioelectronic medicine, also known as neuromodulation, biostimulation and electroceuticals, is an emerging field of medicine in which electrical stimulation is provided to a patient's muscles and neural circuits. The electrical stimuli provided are utilized to restore healthy patterns of electrical impulses and to control various bodily functions. The electric stimuli adjust how neurons fire, and thus change the number of neurotransmitters traveling through a neural circuit, in addition to adjusting the operation of muscle tissue. Bioelectronic medicine can replace or work together with chemical and biological drugs to produce improved therapies for patients.

Bioelectronic medical devices can be configured to treat hemorrhagic shock, control sphincter action, provide intracranial stimulation, treat epileptic seizures, treat irritable bowel syndrome, treat muscle wasting, treat chronic pain, enhance muscle performance, as well as operate as a cardiac pacemaker, among many other configurations and treatments.

Additionally, more than 1 million pacemakers are implanted around the world each year and this number is increasing yearly due to an aging population. The main indication for pacemaker implantation is the atrioventricular block which induces bradycardia, or very slow heart rate, or no heart rate at all, Cardiac pacemaker technology has rapidly advance in the last 70 years. Reduction in generator size, increased battery longevity, quality of pacemaker leads, and algorithmic and rate responsive programming all have revolutionized and transformed the implantation and management of transvenous cardiac pacemaker (TV-PPM).

Despite these advances, the potential for complications and technical failure necessitates consideration, Short-term complications, which have been reported to be as high as 12%, are typically related to the presence of a transvenous lead and or subcutaneous pocket. These complications include pneumothorax, cardiac perforation, lead dislodgement, and pocket infection or hematoma. Long-term complications are also related primarily to the pacing lead and subcutaneous pocket, and include pocket infection, tricuspid regurgitation, venous obstruction, lead fractures and insulation failure. In addition, development of lead related endocarditis is a significant concern, with mortality rates reported between 12%-31%. Some studies have shown that long-term complications are primarily related to lead failure, identifying it as the weakest component of the current pacing system. Data obtained from the Truven MarkestScan database, which tracks Medicare and US health care claims, showed a 15%-16% complication rate at three years among 72,701 patients with TV-PPM, representing a significant economic burden to both the patient and healthcare system. (Kirkfeldt et al., *Eur Heart J.* 2014; 35:1186-1194), (Udo et al., *Heart rhythm.* 2012; 9:728-735)

Leadless pacemakers were initially conceptualized in the 1970s and successfully implanted in dogs using a mercury battery powered capsule. With catheter-based delivery systems leadless pacemakers became a reality. These devices are implanted inside the right ventricle using dedicated delivery catheters. In addition to offering a cosmetic benefit, the leadless design and the lack of a surgically created subcutaneous pocket eliminate major drawbacks. To date, 2 leadless pacemakers are commercially available: Micra (Medtronic, Minneapolis, Minnesota) and Nanostim (St. Jude Medical, St. Paul, Minnesota). However, these devices have the significant limitation of performing single-chamber ventricular pacing only. Therefore, present leadless pacemakers are not well suited for the majority of patients (over 80%) in whom a dual-chamber system or cardiac resynchronization therapy is preferred due to medical reasons. Communication between different pacing sites is also key to optimal physiological response. Hence, dual-chamber pacing systems have the advantage over single chamber leadless pacemakers. (Sideris et al., *Hellenic J Cardiol.* 2017; 58:403-410), (Tjong et al., *Circulation.* 2017; 135:1458-1470)

SUMMARY

In one aspect, a leadless multi-site stimulator system comprises a transmit stimulator device comprising a first radially expandable stent structure, a battery electrically coupled to at least one transmit stimulator electrode, a wireless transmit coil comprising the first radially expandable stent structure, and at least one transmit stimulator electronic circuit configured to transmit a stimulation signal, and at least one receive stimulator device comprising a second radially expandable stent structure, at least one receive stimulator electrode, a wireless receive coil comprising the second radially expandable stent structure, and at least one receive stimulator electronic circuit configured to receive a stimulation signal generated from the at least one transmit stimulator electronic circuit.

In one embodiment, the battery, the at least one transmit stimulator electrode, and the at least one transmit stimulator electronic circuit are electrically connected via the wireless transmit coil. In one embodiment, the wireless transmit coil stent is about 3 cm in diameter and about 2 cm in length. In one embodiment, the wireless transmit coil stent is self-expanding. In one embodiment, the battery is flexible. In one embodiment, the battery is about 9 cm wide, about 3 cm long and about 805 µm thick. In one embodiment, the first and second radially expandable stent structures include a series of struts. In one embodiment, the at least one transmit stimulator electrode is disposed at an intersection between the struts of the first radially expandable stent structure, and wherein the at least one receive stimulator electrode is disposed at an intersection between the struts of the at least one second radially expandable stent structure.

In one embodiment, the at least one receive stimulator electrode and the at least one receive stimulator electronic circuit are electrically connected via the wireless receive coil. In one embodiment, the wireless receive coil stent is about 20 mm in length and 4-6 mm in diameter. In one embodiment, the wireless receive coil stent is self-expanding. In one embodiment, the at least one transmit stimulatorelectronic circuit comprises a transmit stimulation control unit, an accelerometer, a sensing control unit, a sensing electrode, a power control unit, an embedded trace microcell architecture specification (ETMCR) control unit, an amplifier and a transmit tuning circuit.

In one embodiment, the at least one receive stimulator electronic circuit comprises a receive tuning circuit, an AC/DC converter, a receive stimulation control unit, an electrode cathode, and an electrode anode. In one embodiment, the transmit stimulator device at the least one receive stimulator device are configured to advance into and deploy within an anatomical lumen. In one embodiment, the stimulation signal comprises at least one of a pacemaking signal, a deep brain stimulation signal, a vagus nerve stimulation signal and a nerve innervation signal.

In another aspect, a leadless multi-site bioelectronic stimulator system implantation method comprises, providing a multi-site bioelectronic stimulator system including a transmit stimulator device and at least one receive stimulator device, placing the transmit stimulator device within a first anatomical stimulation location, and placing the at least one receive stimulator device within at least one second anatomical stimulation location.

In one embodiment, the transmit stimulator device is placed in a location selected from the group consisting of the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle. In one embodiment, the transmit stimulator device is placed via advancing through an anatomical lumen and deploying from a catheter.

In one embodiment, wherein the at least one receive stimulator device is placed in a location selected from the group consisting of the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle. In one embodiment, the at least one receive stimulator device is placed via advancing through an anatomical lumen and deploying from a catheter.

In another aspect, a leadless multi-site stimulation method comprises providing a multi-site stimulator system including a transmit stimulator device and at least one receive stimulator device, providing a first electrical stimulation by the transmit stimulator device located in a first stimulation location, and providing a second electrical stimulation based on the time of the first stimulation by the at least one receive stimulator device located in at least one second stimulation location.

In one embodiment, a plurality of receive stimulator devices are provided at a plurality of second stimulation locations, and wherein a subset of the plurality of receive stimulator devices are selectively powered to provide electrical stimulation at a subset of the plurality of the second stimulation locations.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 19 is a perspective view of a stent and pressure contour distribution results according to one embodiment.

FIG. 20 is a top view of the fixed geometry at the top of the stent according to one embodiment.

DETAILED DESCRIPTION OF THE INVENTION

Figure 1:
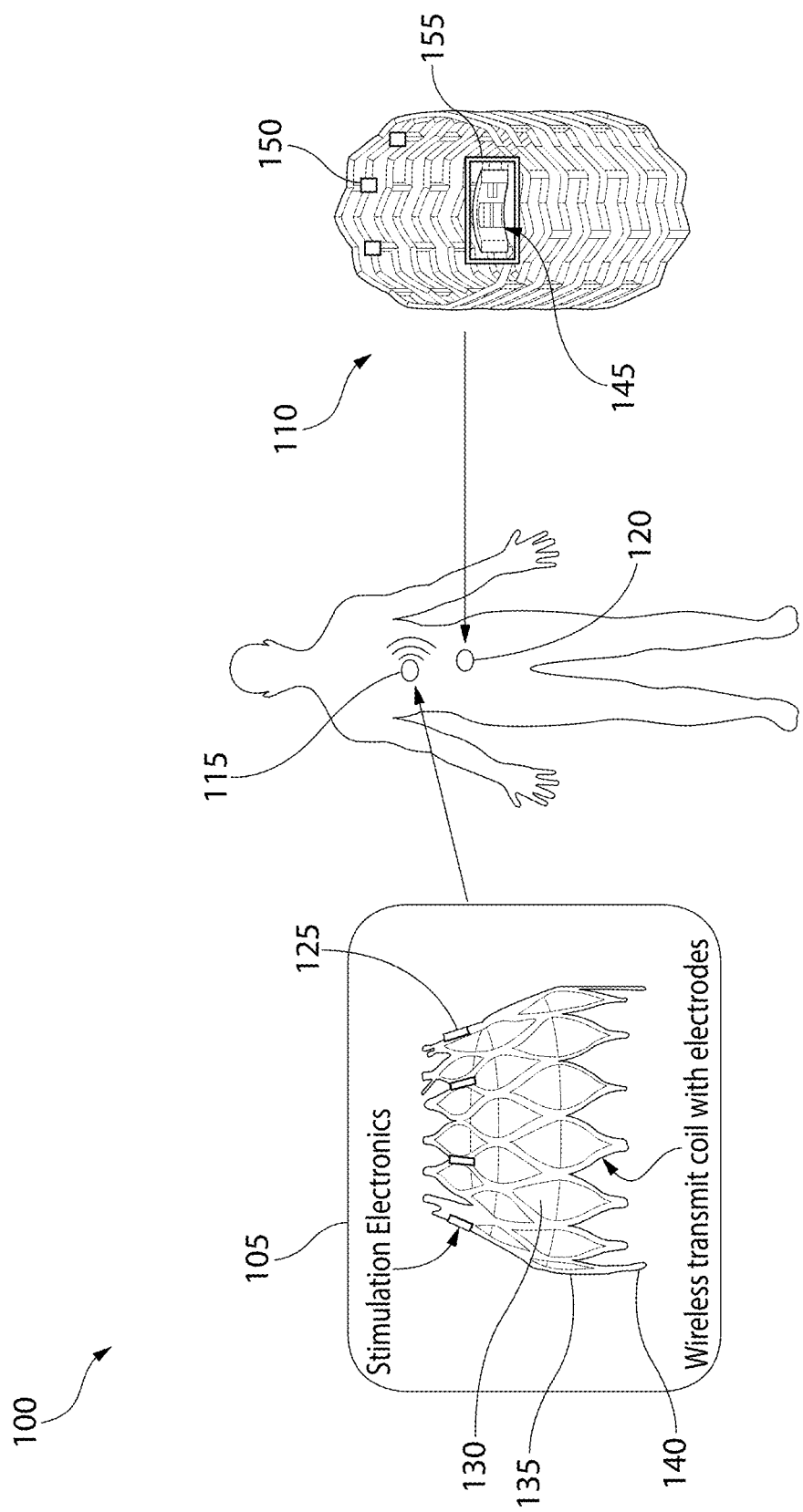
FIG. 1 is a diagram illustrating a leadless multi-site bioelectronic stimulator system according to one embodiment.

It is to be understood that the figures and descriptions of the present invention have been simplified to illustrate elements that are relevant for a more clear comprehension of the present invention, while eliminating, for the purpose of clarity, many other elements found in systems and methods of bioelectronic stimulator systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a leadless multi-site bioelectronic stimulator system.

A leadless multi-site bioelectronic stimulator system provides for multiple advantages over single site and non-leadless bioelectronic stimulators. Leadless stimulators provide for fewer short term and long-term complications. Additionally, multi-site stimulation provides for advanced stimulation options, including stimulation at multiple sites at various times, for a more optimized stimulation method. The device components of a multi-site stimulator system need to be in communication for correct synchronization of stimulation operations.

To preserve synchrony, these devices must communicate wirelessly with each other. For example, a typical communication scenario in a bioelectronic stimulator system configured as a leadless dual-chamber pacemaker could work as follows: the atrial stimulator device stimulates the right atrium (RA) and immediately sends a synchronization message to the ventricular stimulator device that comprises information such as the atrioventricular pacing delay. This message is received almost instantly by the ventricular stimulator device, which reacts accordingly within the same heart cycle.

Cardiac resynchronization therapy (CRT) is one of the most successful heart failure therapies to emerge in the last 25 years and is applicable to 25-30% of patients with symptomatic heart failure. Large randomized trials have demonstrated that CRT improves quality of life (QoL), reduces heart failure hospitalizations and mortality, and reverses the structural remodeling of the heart. Clinical response to CRT is, however, variable with up to one-third of patients not responding. In an effort to improve CRT response, alternative methods of CRT delivery, including multisite pacing (MSP), have been developed. Pacing the left ventricle from more than one coronary sinus (CS) site simultaneously can improve acute hemodynamic response and medium-term outcomes. (European Heart Rhythm A et al., *Heart Rhythm.* 2012; 9:1524-1576)

Additionally, bioelectronic medicine can be utilized to treat hemorrhagic shock, control sphincter action, provide intracranial stimulation, treat epileptic seizures, treat irritable bowel syndrome, treat muscle wasting, treat chronic pain, enhance muscle performance, operate as a cardiac pacemaker, treat paraplegic patients, treat Parkinson's disease patients, treat spinal cord injury, provide deep brain stimulation, among other treatments.

Disclosed is a leadless multi-site bioelectronic stimulator system comprised of wirelessly controlled pulse generating stents.

Figure 3:
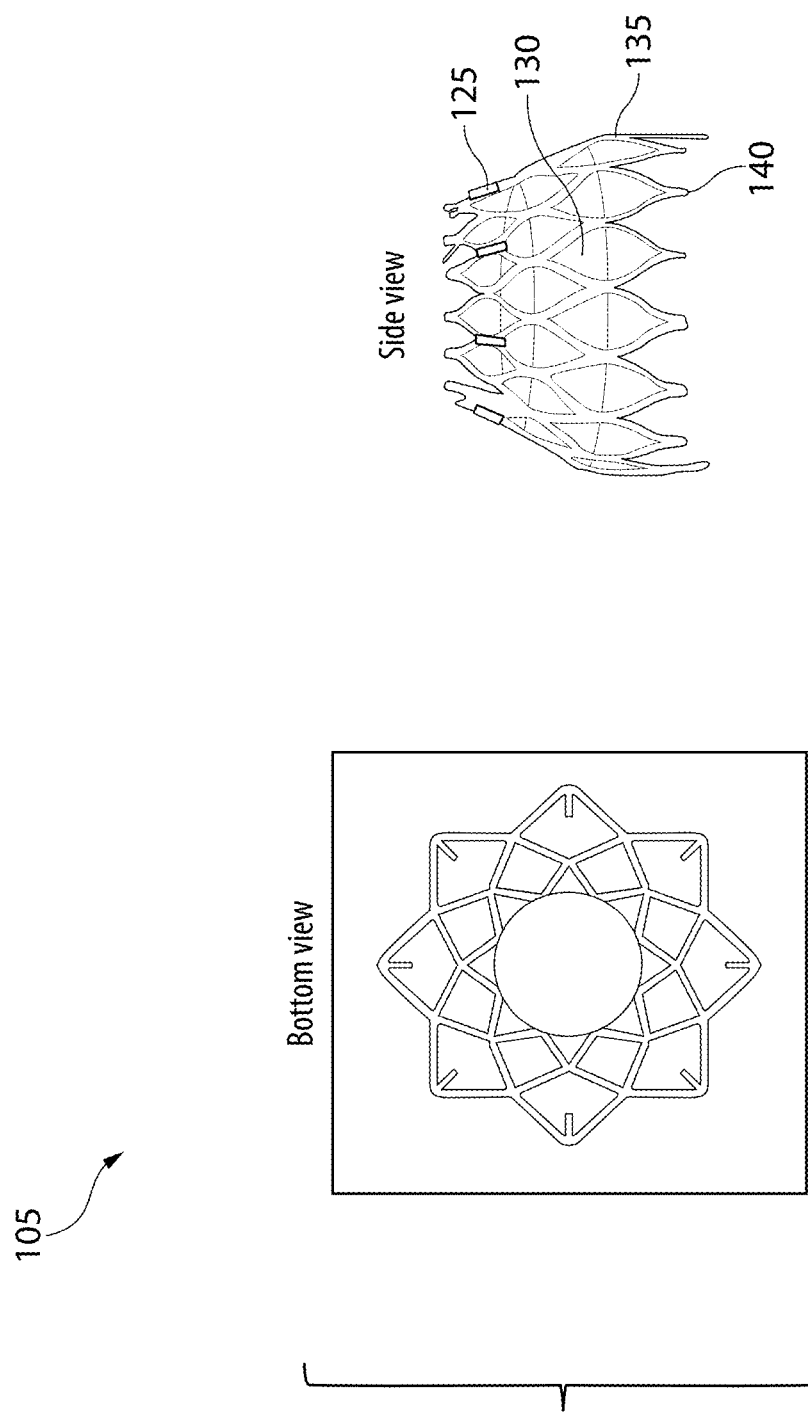
FIG. 3 is a diagram illustrating a transmit stimulator device of the of the bioelectronic stimulator system of FIG. 1 according to one embodiment.
Figure 4:
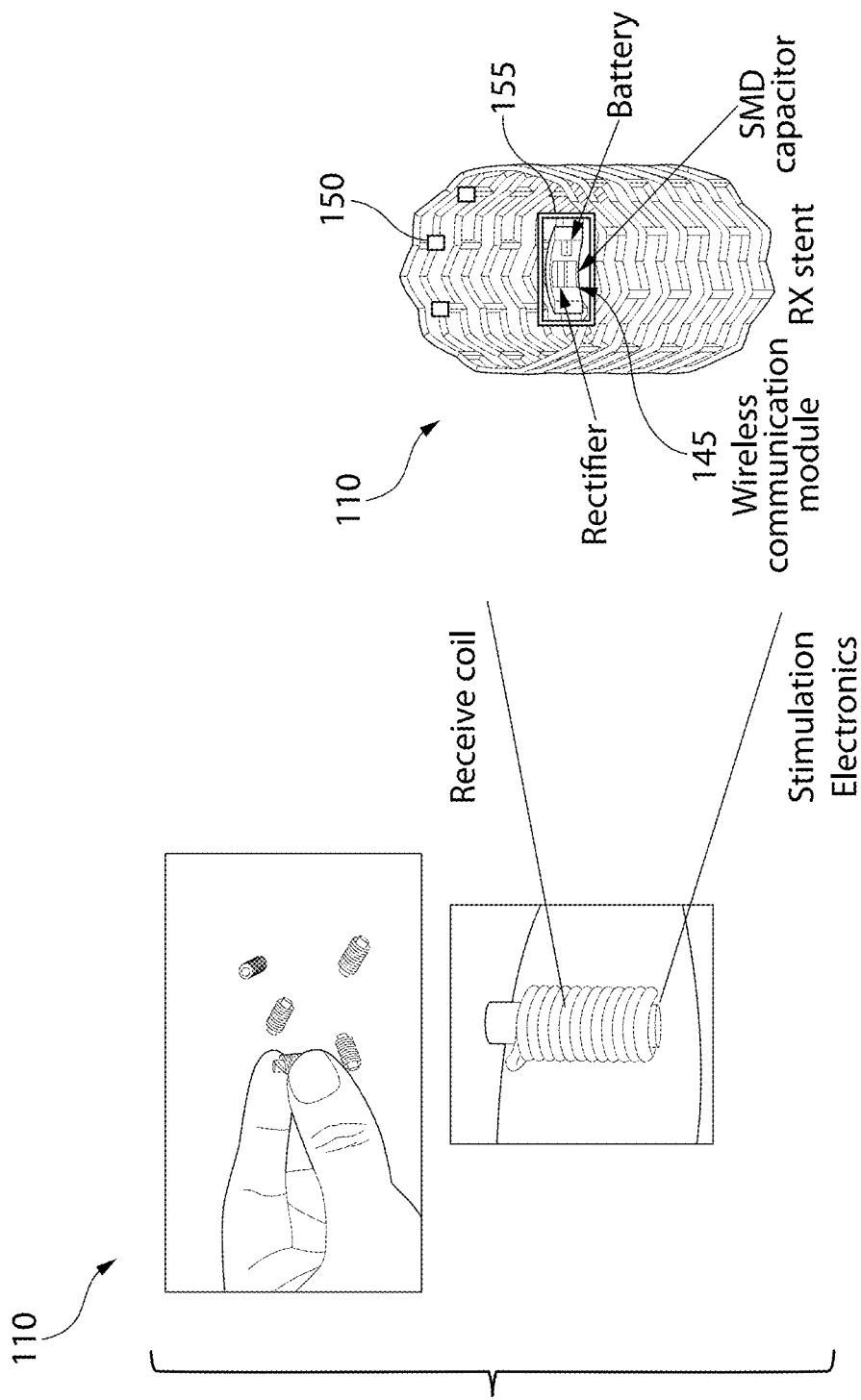
FIG. 4 is a diagram illustrating a receive stimulator device of the bioelectronic stimulator system of FIG. 1 according to one embodiment.
Figure 5:
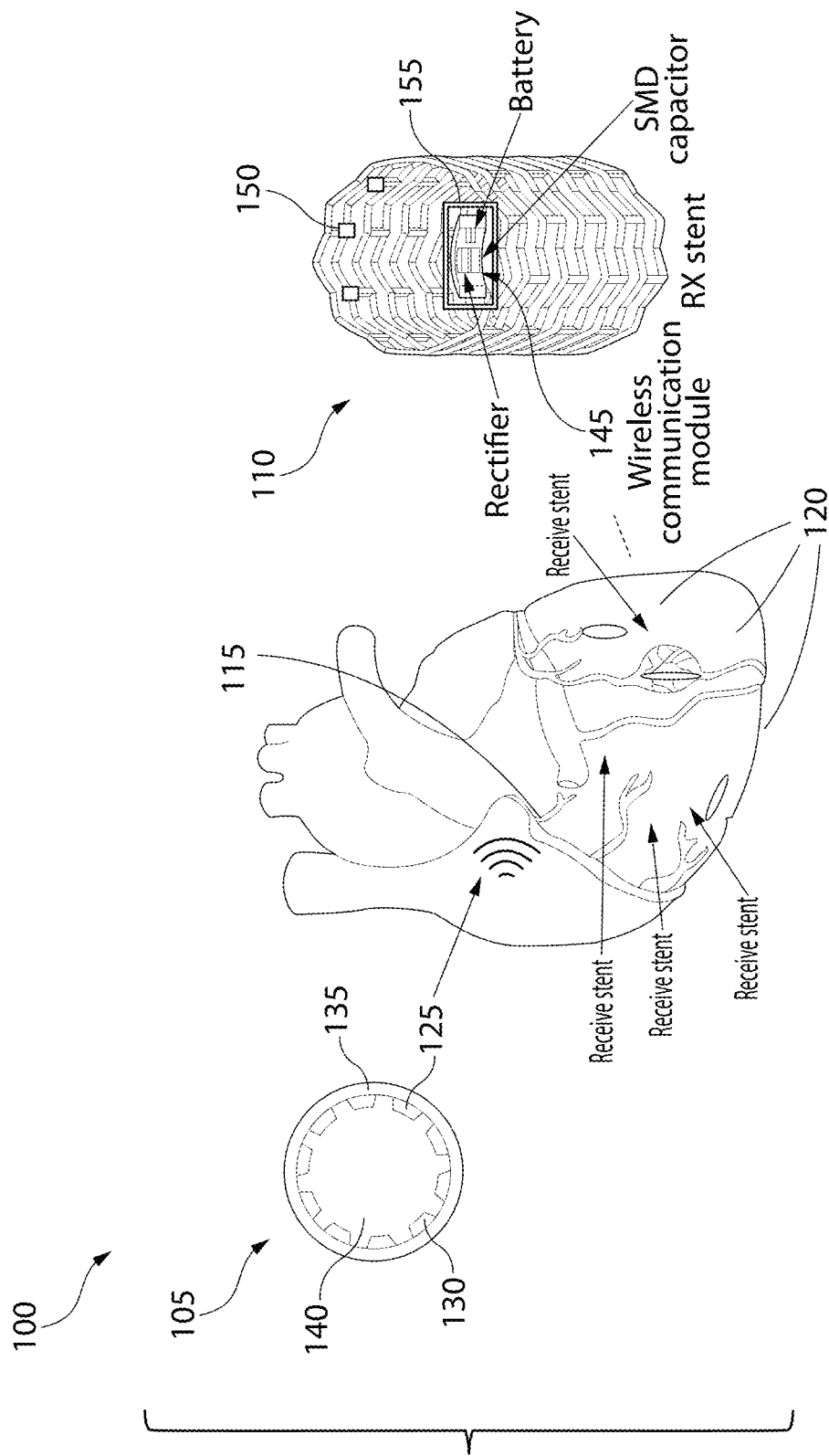
FIG. 5 is a diagram further illustrating an example application of the leadless mufti-site bioelectronic stimulator system of FIG. 1 configured as a pacemaker according to one embodiment.

FIG. 1 is a diagram illustrating a leadless multi-site bioelectronic stimulator system 100 according to one embodiment. The system 100 comprises a transmit stimulator scaffold device 105 and at least one receive stimulator scaffold device 110. An example application with further details of the system 100 are shown in FIG. 5. FIG. 3 shows further details of a transmit stimulator device 105. FIG. 4A shows further details of a receive stimulator device 110. The upper left inset of FIG. 4A shows a group of proof of concept receive stimulator devices 110 where a subset of the devices are selectively powered. With reference now to FIG. 4B, The transmit stimulator device 105 comprises a first radially expandable stent structure which includes a battery 130 electrically coupled to at least one transmit stimulator electrode 140. The first radially expandable stent structure is further configured to act as a wireless transmit coil 135. Additionally, at least one transmit stimulator electronic circuit 125 is electrically connected to the first radially expandable stent structure and configured to transmit a stimulation signal via the stent structure acting as the wireless transmit coil 135. Thus, the battery 130 the at least one transmit stimulator electrode 140, and the at least one transmit stimulator electronic circuit 125 are electrically connected via the stent acting as the wireless transmit coil 135.

In one example embodiment, the wireless transmit coil 135 stent is about 3 cm in diameter and about 2 cm in length. In one embodiment the wireless transmit coil 135 stent is self-expanding. In one embodiment the battery 130 is flexible. In one embodiment the battery 130 is removable. In one embodiment the battery is about 9 cm wide, about 3 cm long and about 805 µm thick. In one embodiment the first radially expandable stent structure includes a series of struts. In one embodiment, the at least one transmit stimulator electrode 140 is disposed at an intersection between the structs of the first radially expandable stent structure. In one embodiment, the transmit stimulator device 105 can be located in a first stimulation location 115. The first stimulation location 115 can include locations at, in or near, for example, the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle, among other suitable locations.

The at least one receive stimulator device 110 comprises a second radially expandable stent structure which includes a least one receive stimulator electrode 150 electrically coupled to the second radially expandable stent structure. Stimulator electrodes 150 in one embodiment can be disposed radially around a section of the expandable stent structure. Furthermore, at least one receive stimulator electronic circuit 155 is electrically connected to the second radially expandable stent structure. The receive stimulator electronic circuit 155 components can include a rectifier, wireless communication module, SMD (surface mount device) capacitor and battery. The rectifier and capacitor are configured for storing energy, sensing data and providing electrical stimulus of a desired strength. The sensing data in turn is communicated back using the wireless communication link, which in turn returns data on impedance, inductance, resistance, admittance and conductance, all parameters important for properties of local tissue and its response to disease and electrical stimulus. A capacitor allows for back-up of potential electrical energy storage and discharge. The at least one receive stimulator electrode 150 and the at least one receive stimulator electronic circuit 155 are electrically connected via the wireless receive coil 145. Additionally, the second radially expandable stent structure further acts as a wireless receive coil 145, and the at least one receive stimulator electronic circuit 155 is configured to receive the stimulation signal generated from the at least one transmit stimulator electronic circuit 125 of the transmit stimulator device 105 via the wireless receive coil 145.

In one example embodiment the at least one wireless receive coil 145 stent is about 20 mm in length and 4-6 mm in diameter. In one embodiment the at least one second radially expandable stent structure includes a series of struts. In one embodiment, the at least one receive stimulator electrode 150 is disposed at an intersection between the structs of the at least one second radially expandable stent structure. In one embodiment the wireless receive coil 145 stent is self-expanding. In one embodiment the at least one receive stimulator device 110 can be located in a second stimulation location 120. In one embodiment, the second stimulation location 120 can include locations at, in or near, for example, the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle, among other suitable locations. In one embodiment, the second stimulation location 120 can include multiple locations at, in or near, for example, the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle, among other suitable locations.

Due to the size and structure of the scaffold stent devices (105, 110), the devices can be positioned within any hollow cylindrical biological structure, such as the lumen of GI tract, veins, arteries, and ureters, among others, for example. Additionally, the devices (105, 110) can be positioned in non-hollow biological structures, such as muscles, nerves, the thoracic cavity, the abdominal cavity, in cerebrospinal fluid (CSF), and in potential anatomical spaces (where space can be created by separating muscles, fascia, membranes, organs), among others, for example.

Figure 2:
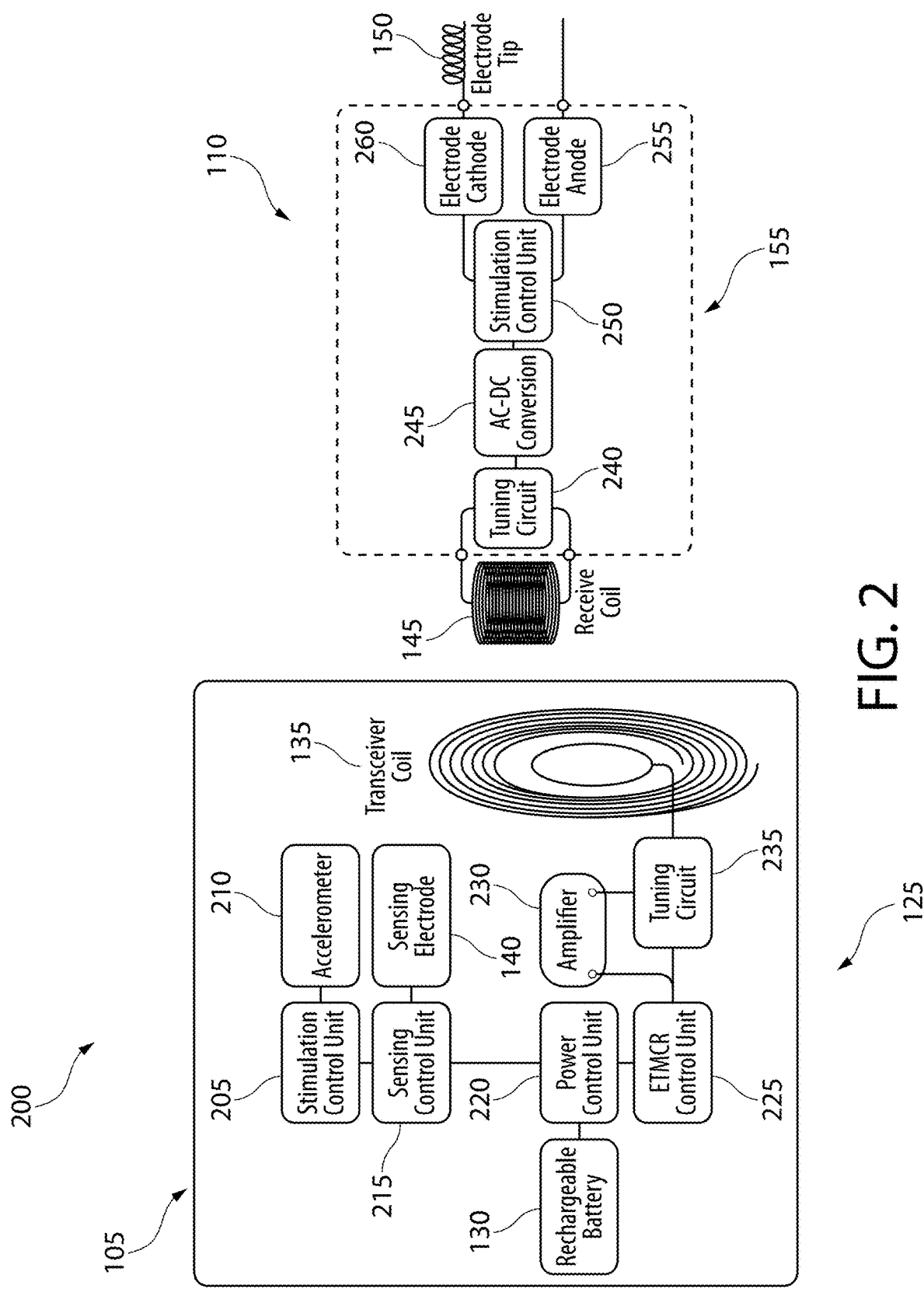
FIG. 2 is a diagram illustrating electronic components of the bioelectronic stimulator system of FIG. 1 according to one embodiment.

FIG. 2 is a diagram illustrating electronic components 200 of the system 100. The transmit stimulator device 105 includes transmit stimulator electronics 125 including a rechargeable battery 130, a stimulation control unit 205, an accelerometer 210, a sensing control unit 215, a sensing electrode 140, a power control unit 220, an embedded trace microcell architecture specification (ETMCR) control unit 225, an amplifier 230, a tuning circuit 235 and a transceiver coil 135.

The at least one receive stimulator device 110 includes receive stimulator electronics 155 comprised of a receive coil 145, a tuning circuit 240, an AC/DC converter 245, a stimulation control unit 250, an electrode anode 255, and electrode cathode 260, and an electrode tip for the receive stimulator electrode 150.

The transmit stimulator device 105 uses the battery 130 to power the amplifier 230 in order to wirelessly power the receive stimulator electrode 150 of the receive stimulator device 110. The ETMCR control unit 225 and the tuning circuits (235, 240) can be used to modify the wireless power signal and selectively communicate and/or power one or more of the receive stimulator electrodes 150 of the at least one receive stimulator device 110.

In one embodiment, a continuous signal delivered to the receive coil 145 will provide constant power to the implanted receive stimulator device 110, where the stimulation control circuit 250 will determine when to provide a stimulation electrical impulse.

In one embodiment, the wireless power signal can be synced to biological data of the patient by using the sensing electrode 140, accelerometer 210, stimulation control unit 205 and sensing control unit 215 of the transmit stimulator electronics 125. These biological data can include, for example, an electrocardiogram (ECG), among other suitable biological data. In this mode, the stimulation is controlled by the wireless power signal alone, where when the receive stimulator device 110 receives power it will automatically provide a stimulating electrical pulse signal at the electrode 150.

The electrodes (140, 150) mounted on the stents can be placed in various location of the patient depending on what treatment is to be provided. These locations can include locations at, in or near, for example, the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle, among other suitable locations.

In one embodiment, the electrodes (140, 150) are wirelessly powered from either an implanted battery 130, or from an external controller unit capable of recharging the battery 130. Flexible wireless power delivery to the implanted devices allows for several stimulator devices (105, 110) to be used in multiple sites (115, 120). The system 100 can deliver electrical energy across a wide range of power levels from micro-watts to watts.

The system 100 can be utilized for many different bioelectronic medical procedures and treatments. For example, as shown in FIG. 5, the system 100 can be utilized as a pacemaker, and further be configured as a dual-chamber pacemaker.

Also, the system 100 can be used in stimulation of the diaphragm. This can help treat quadriplegics and those with injury to phrenic nerve. It can also be used to modulate and facilitate ventilator wean, where the intended stimulator coil can be placed within the veins that surround and drain the diaphragm. The system 100 can also be placed in the nasogastric tube (for temporary use), in the thoracic cavity, in the abdominal cavity by laparoscopic methods, or in the neck close to phrenic nerve to provide the necessary stimulation for treatment. With ventilator weaning, early ventilator wean can fail due to a patient's inability to use their thoracic muscles. These muscles can be periodically stimulated by the system 100 stimulating the nerves which supply them to coordinate breathing and prevent ventilator associated pneumonia.

Additionally, the system 100 can also be utilized for stimulating and controlling sphincter action in periodic fashion for colostomy and/or ileostomy, by placing the system near the anal sphincter, the esophageal sphincter, the gastroesophageal sphincter (upper and lower), in either temporary or permanent fashion.

Figure 8:
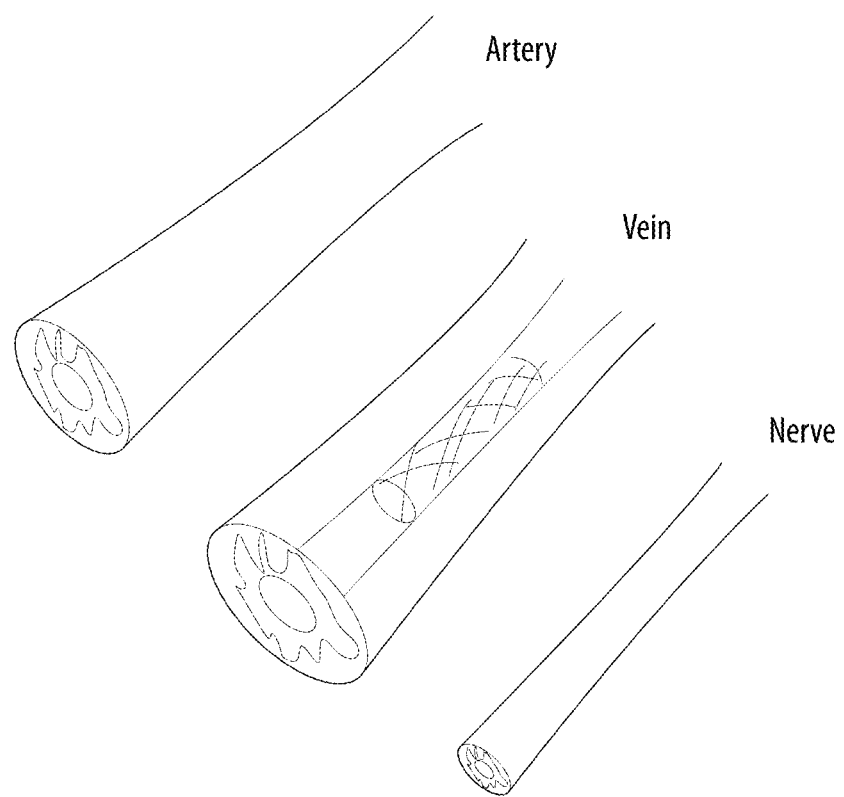
FIG. 8 is a diagram illustrating example anatomical application sites for utilization of the leadless multi-site bioelectronic stimulator system of FIG. 1 close to a target nerve in a neurovascular bundle according to one embodiment.

They system 100 can also stimulate and/or inhibit nerves by placing it close to the target nerve in the neurovascular bundles since every peripheral nerve is accompanied by an artery and vein (see e.g. FIG. 8A). This allows application in phantom pain, intractable pain, rest pain, neurogenic pain, and post-operative pain. Electrical stimulation to control neural transmission and suppression of pain is well established.

Additionally, the system 100 can be used in an anti-obesity application by suppression of satiety, via placement near vagal nerves and direct stimulation of the stomach, thus stimulating feeling of fullness and/or providing early emptying of the stomach.

Intracranial stimulation currently is limited due to inability to place stimulator inhibitor in deep brain tissue. The system 100 can be placed in any vein in the intended target without having to open the skull and thereby possibly damaging the brain. This can be temporary or permanent. Cranial nerves can be stimulated/inhibited for trigeminal neuralgia, headache, migraine, hemiplegia/paraplegia. Additionally, epileptic seizure activity arising in particular brain areas can be inhibited by placing the system 100 in veins sub-dural, dural and/or sub-arachnoid locations placed via endo neurosurgery techniques.

Treatment of irritable bowel syndrome and frequent diarrhea can be performed by the system 100 by placing the stimulator in the mesenteric vein to suppress the unwanted gastro-intestinal motility that is responsible for urge to empty bowel. Similarly, the system 100 can treat bladder irritability and frequent emptying/retention due to neurogenic bladder, which can be manipulated by stimulator coils to stimulate/suppress bladder function. Ureteric emptying can be modulated similarly by the system 100 when there is stasis of urine within the ureter due to loss of neural stimulation since the ureters have vein that are close by.

Also, paraplegia/muscle wasting due to neuromuscular disease can be treated by periodic stimulation to prevent muscle atrophy by placing the system 100 close to target nerves to stimulate the muscles externally or via implanted transmit coils. Nerve paralysis/injury can be treated in a similar fashion with system 100. Similarly, the system 100 can be used in muscle performance enhancement by targeted stimulation of muscles or groups of muscles externally or internally to improve performance. The performance improvement of targeted muscle/group of muscle training with deep implants can also be realized with the system 100.

The system 100 can further treat chronic backache by stimulating and strengthening particular nerves to ameliorate the effect of the backache and to control pain pathways. In certain embodiments, the system 100 is advanced into an anatomical lumen (for example using a Seldinger technique) and deployed to implement vagus nerve stimulation, stomach wall stimulation, coronary sinus stimulation, obesity treatment (e.g. stimulating the vagus nerve to provide a feeling of being full), phantom pain/nerve stimulation treatment near veins in amputated stump, and artery, vein and/or nerve placement for nerve innervation.

Figure 6:
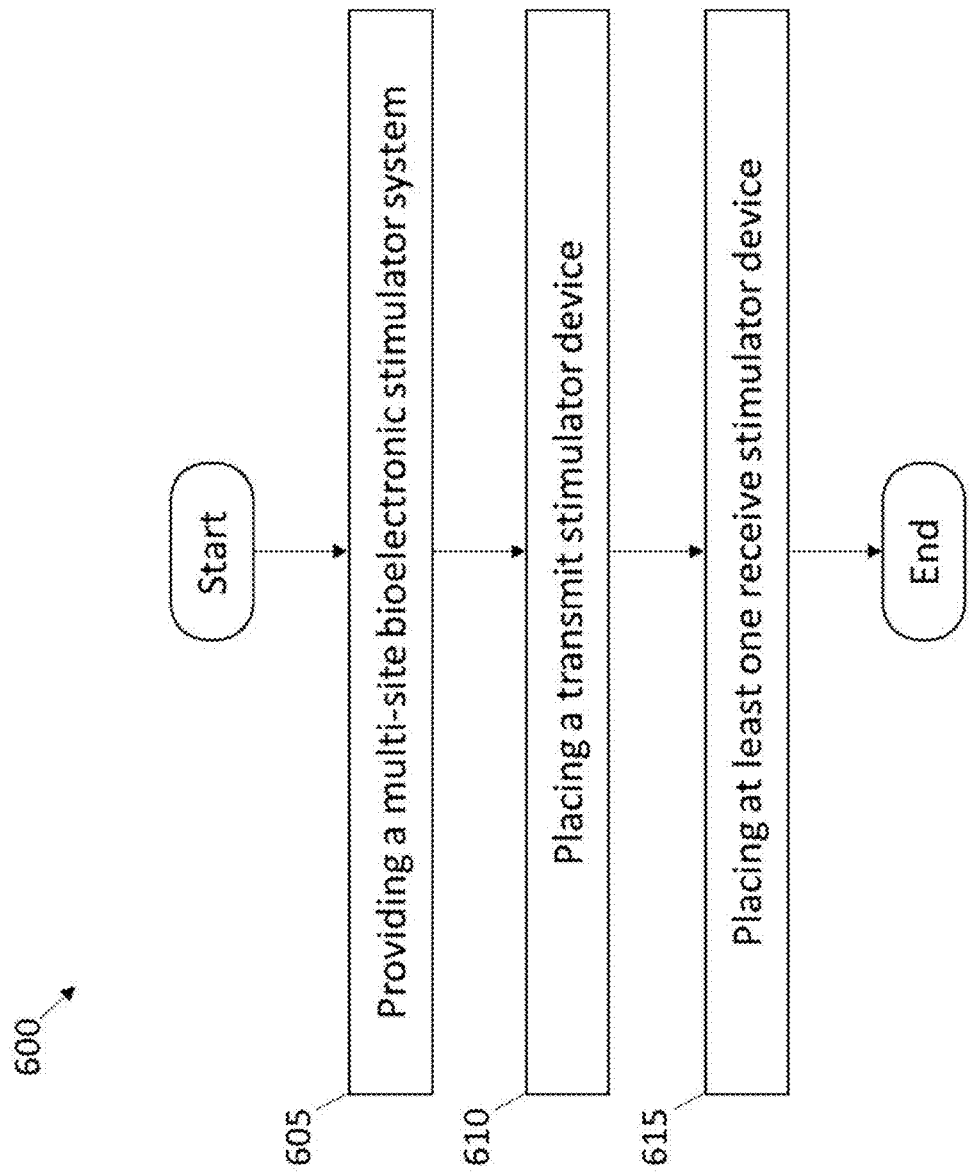
FIG. 6 is a flowchart showing a leadless multi-site bioelectronic stimulator implantation method according to one embodiment.

FIG. 6 is a flowchart depicting a leadless multi-site bioelectronic stimulator system implantation method. The method begins at operation 605, where a multi-site bioelectronic stimulator system 100 is provided. The system 100 includes a transmit stimulator device 105 and at least one receive stimulator device 110. At operation 610 the transmit stimulator device 105 is placed in a first stimulation location 115.

This first stimulation location 115 can include locations at, in or near, for example, the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle, among other suitable locations. In one embodiment, the transmit stimulator device 105 is placed via a catheter delivery system. In one embodiment, the transmit stimulator device 105 is placed laparoscopically. In one embodiment, the transmit stimulator device 105 is placed via a scopic procedure. In one embodiment, the transmit stimulator device 105 is placed intravenously. In one embodiment, the transmit stimulator device 105 is placed subcutaneously. In one embodiment, the transmit stimulator device 105 is placed transcutaneously. In one embodiment, the transmit stimulator device 105 is placed intramuscularly. In one embodiment, the transmit stimulator device 105 is placed intradermally. In one embodiment, the transmit stimulator device 105 is placed intracranially. In one embodiment, the transmit stimulator device 105 is a radially expandable stent structure that is in a compressed state to fit in a catheter, and then self-expands to a semi-expanded state when placed, thus interacting with the surrounding tissue to provide a force to prevent slipping.

At operation 615 the at least one receive stimulator device 110 is placed in at least one second stimulation location 120. The second stimulation location 120 can include multiple locations at, in or near, for example, the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle, among other suitable locations. In one embodiment, the at least one receive stimulator device 110 is placed via a catheter delivery system. In one embodiment the at least one receive stimulator device 110 is placed laparoscopically. In one embodiment, the at least one receive stimulator device 110 is placed via a scopic procedure. In one embodiment, the at least one receive stimulator device 110 is placed intravenously. In one embodiment, the at least one receive stimulator device 110 is placed subcutaneously. In one embodiment, the at least one receive stimulator device 110 is placed transcutaneously. In one embodiment, the at least one receive stimulator device 110 is placed intramuscularly. In one embodiment, the at least one receive stimulator device 110 is placed intradermally. In one embodiment, the at least one receive stimulator device 110 is placed intracranially. In one embodiment, the at least one receive stimulator device 110 is a radially expandable stent structure that is in a compressed state to fit in a catheter, and then self-expands to a semi-expanded state when placed, thus interacting with the surrounding tissue to provide a force to prevent slipping.

Figure 7:
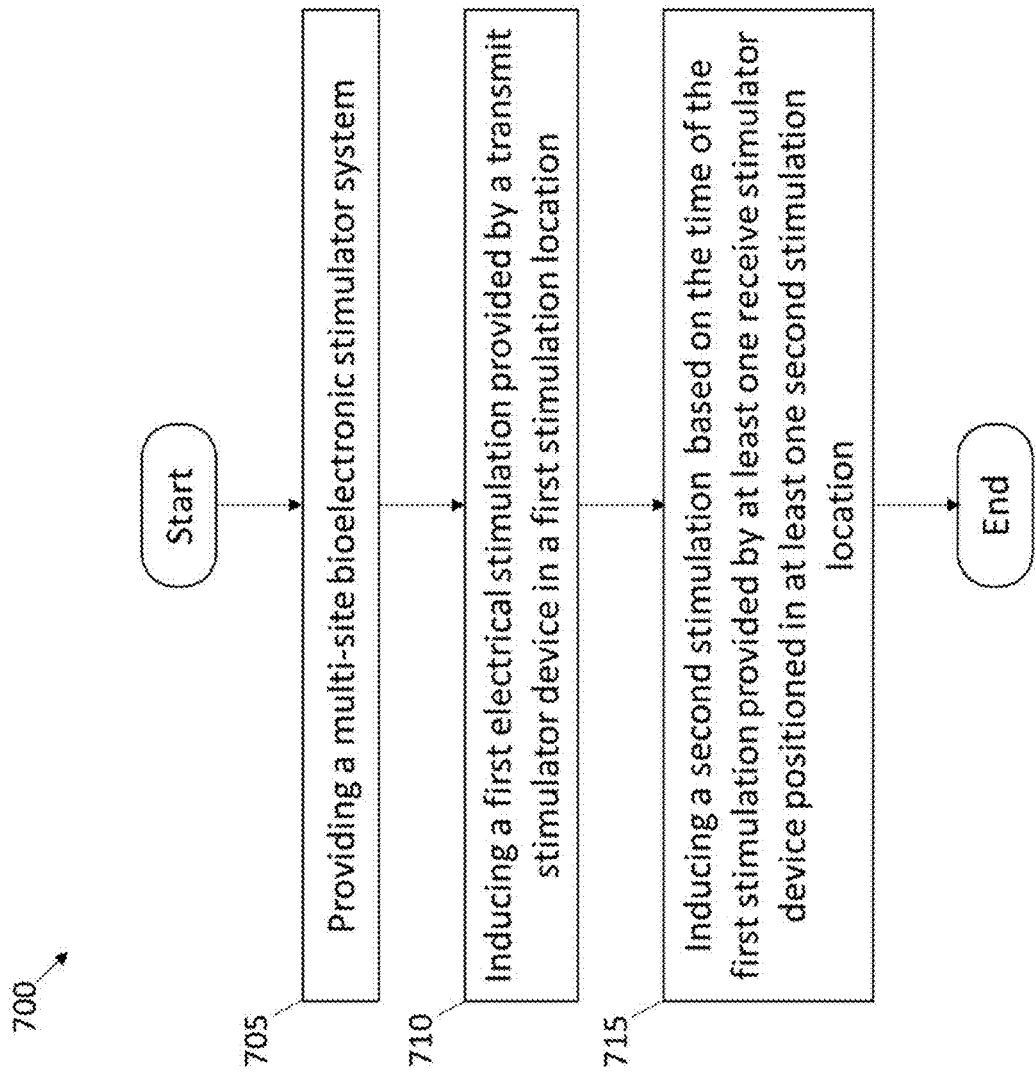
FIG. 7 is a flowchart showing a leadless multi-site bioelectronic stimulation method according to one embodiment.

FIG. 7 is a flowchart depicting a leadless multi-site stimulation method. The method begins at operation 705, where a multi-site stimulator system 100 is provided. The system 100 includes a transmit stimulator device 105 and at least one receive stimulator device 110.

At operation 710 a first electrical stimulation is provided by the transmit stimulator device 105 located in a first stimulation location 115. This first stimulation location 115 can include locations at, in or near, for example, the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle, among other suitable locations. In one embodiment, the transmit stimulation device 105 is a radially expandable stent structure.

At operation 715 a second electrical stimulation is provided by the at least one receive stimulator device 110 located in at least one second stimulation location 120 and based on the time of the first stimulation. The second stimulation location 120 can include multiple locations can at, in or near, for example, the right atrial appendage, the left atrial occlusion, the right cardiac atrium, the right cardiac ventricle, the left cardiac atrium, the left cardiac ventricle, the superior vena cava, the coronary veins, the intercostal veins, the diaphragmatic veins, the stomach, the vagal nerves, the baroreceptors, the thoracic cavity, the abdominal cavity, the phrenic nerve, the anal sphincter, the upper gastroesophageal sphincter, the lower gastroesophageal sphincter, a targeted nerve in a neurovascular bundle, the cranial nerves, the mesenteric vein, the bladder, the ureters, and any muscle, among other suitable locations. In one embodiment, the at least one receive stimulator device 110 is a radially expandable stent structure.

In one embodiment, a plurality of receive stimulator devices 110 are provided at a plurality of second stimulation locations 120. In one embodiment, a subset of the plurality of receive stimulator devices 110 are selectively powered to provide electrical stimulation at a subset of the plurality of second stimulation locations 120.

For the example application depicted in FIG. 5, in this method 700 the first electrical stimulation induces pacing of the right atrium, followed by the second electrical stimulation pacing the ventricles, thus giving a synchronous dual chamber pacing.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

In one experimental example, the system 100 is configured as a cardiac pace making system. The system 100 includes a transmit stimulator pacing device 105 positioned in the right atrial appendage and multiple receive stimulator pacing devices 110 positioned within the coronary veins. These devices work via wireless transmission of signal/power to create a more physiological pacing device.

The total impedance which includes the impedance of electrodes and tissue can vary from 200 to 1,000 Ohms (e.g. heart muscle impedance typically ranges from 300 to 500 Ohms). The aim was to deliver the wireless power to the receive pacing device 110 so as to generate 0.4 ms pulse of 3 mA at a given impedance. If the given impedance is 1000 Ohms, the power supplied to create the pulse is 9 mW. Assuming we need to generate 60 pulses per minute, the total amount of battery capacity needed per year is 0.01 Ah. For 10 years, 0.1 Ah. Considering wireless power efficiency of 20%, an extremely conservative estimate, the estimated power supply needed for 10 years of use will be Rx+Tx, where Rx is the power supply needed for the receive stimulator pacing device 110 to pace the left ventricle of the heart and Tx is power supply needed for the transmit stimulator pacing device 105 to pace the right ventricle of the heart. These values are approximately 0.1[Ah]/0.2 and 0.1 Ah respectively, thereby a total 0.6 Ah for 10 years of use.

The stents have sufficient flexibility so that they can successfully crimp into the catheter. At the same time, the stents provide sufficient radial forces following their expansion outside the catheter, achieving stable fixation and contact with the vessel wall without migration. The relatively large area available in right atrial appendage (approx. 3 cm×3 cm×3 cm) allows use of a 27 cm$^2$ (9 cm wide and 3 cm long) with 805 µm thickness primary battery comfortably, which guarantees 10 years of battery capacity, 0.6 Ah, by using the current battery technology. The battery will be rolled up while the stent is delivered through the catheter and will be unrolled (like a ring inside the stent in which opened-up diameter is 3 cm) as the stent expands at the right or left atrial appendage.

The lithium rolled up battery 130 is a flexible and a high-pressure tolerant battery. The transmit stimulator pacing device 105 stent integrating the battery 130 will be crimped into the catheter while it is delivered via the jugular or femoral vein. Similarly, the receive stimulator pacing device 110 stents will be crimped while they are delivered through catheter into coronary veins.

The outer frame of the receive stimulator pacing device 110 stent in contact with the coronary vein wall integrates the receive coil 145 and serves as the ventricular pacing electrodes 150. The wireless power delivered from the transmit stimulator pacing device 105 stent activates the receive stimulator pacing device 110 stents to generate electric pulses. The auto-tuning scheme, including adaptive impedance matching and frequency tracking, ensures maintaining maximum power efficiency. Using a specific frequency for each receive stimulator pacing device 110, it is possible to only activate the designated stimulator device 110 by employing the frequency selection block and control unit embedded in the transmit stimulator pacing device 105. This is analogous to tuning the frequency of a radio to a particular station.

Figures 9A, 9B:
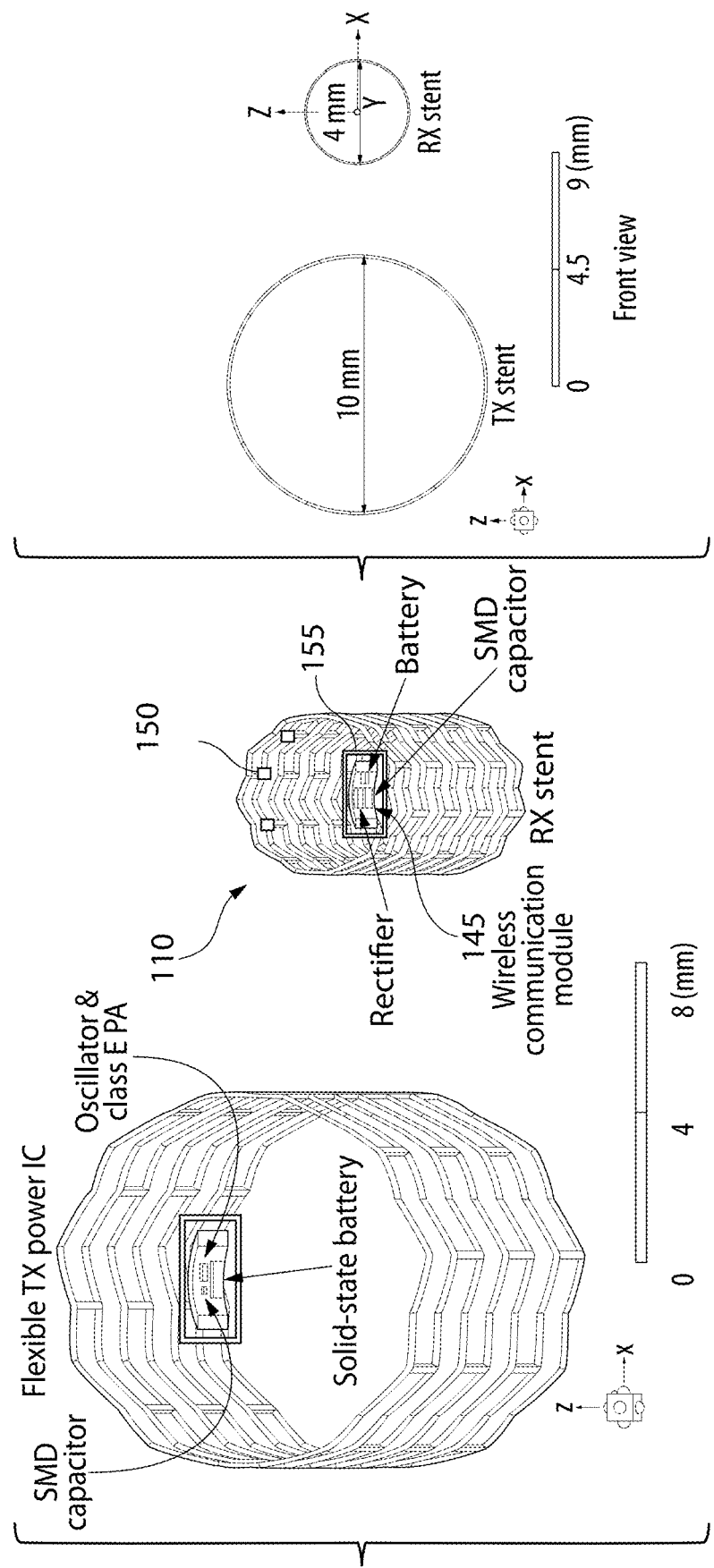
FIG. 9A shows perspective views of a bioelectronic stimulation system according to one embodiment.
FIG. 9B is a head on view of the system shown in FIG. 9A.
Figure 9C:
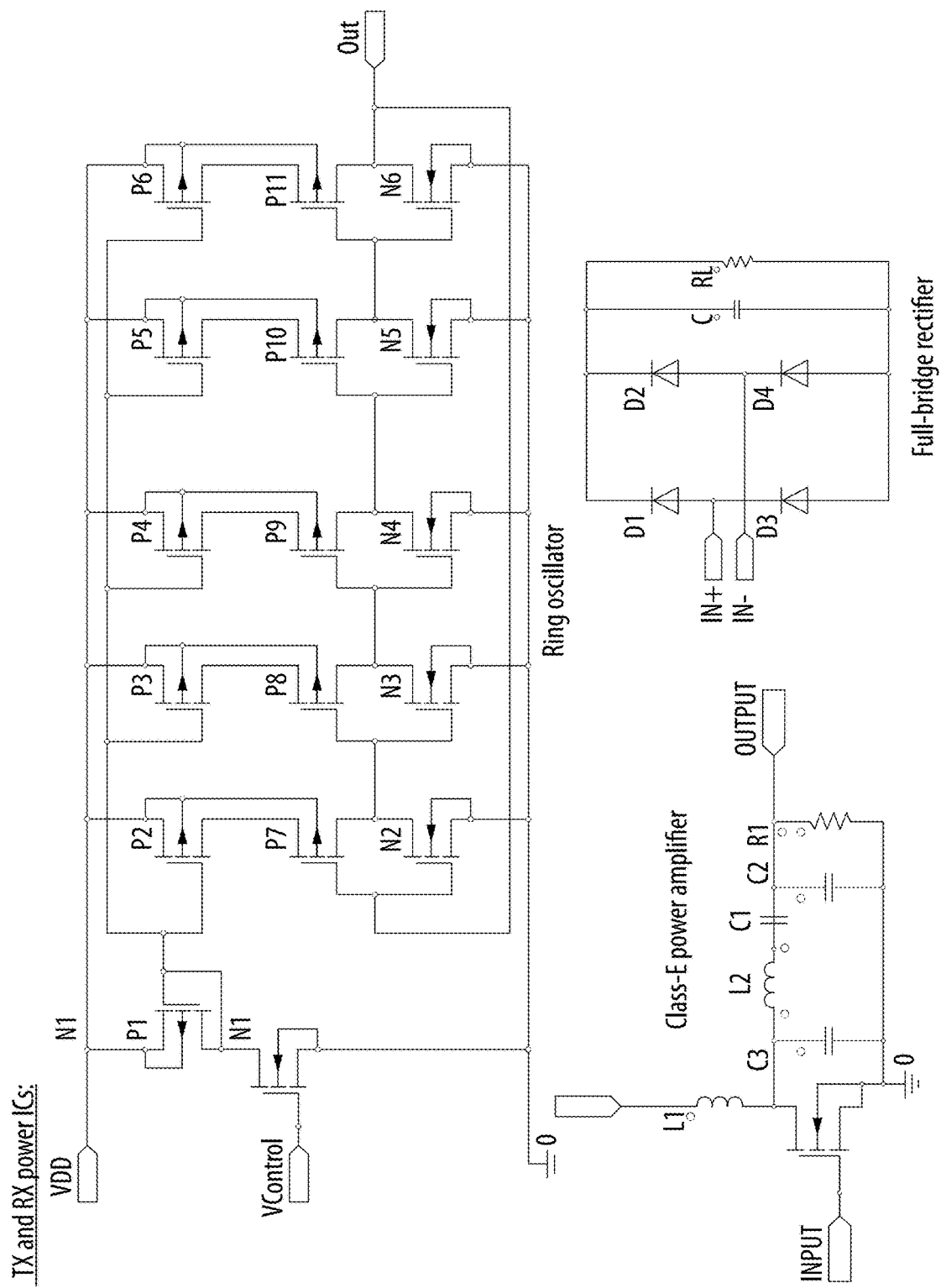
FIG. 9C shows ring oscillator, class-E power amplifier and full-bridge rectifier circuit diagrams according to one embodiment.
Figure 10A:
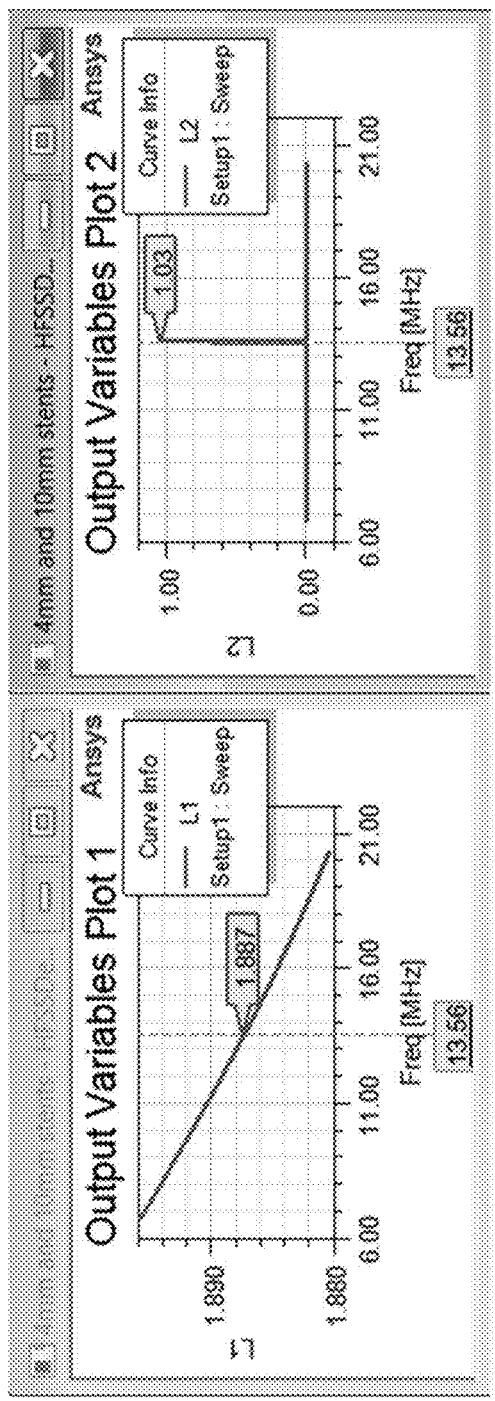
FIG. 10A shows graphs of self-inductance for transmit and receive stents according to one embodiment.
Figure 10B:
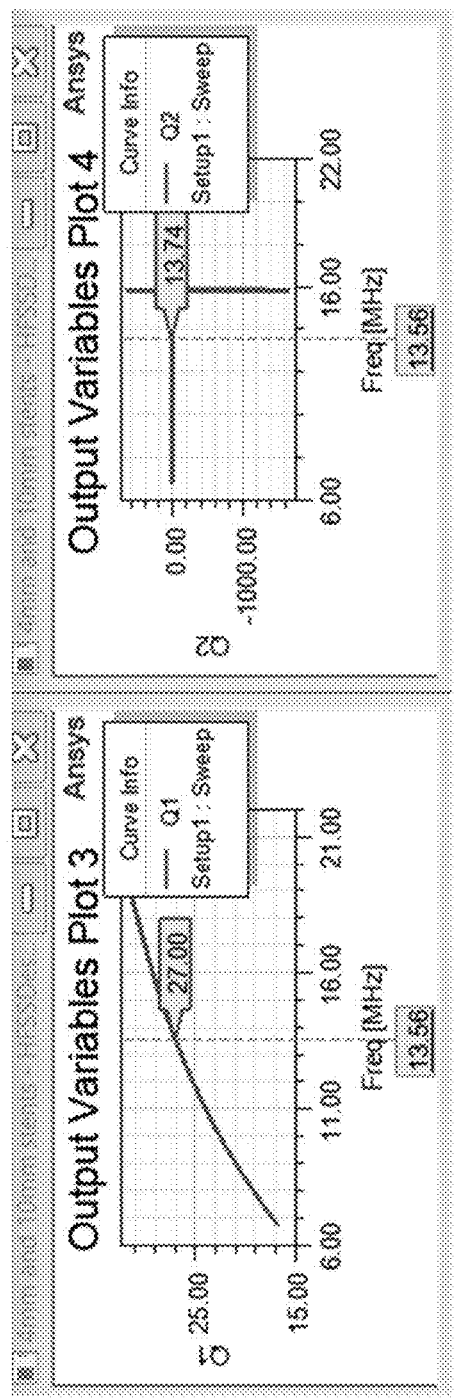
FIG. 10B shows graphs of quality factor for transmit and receive stents according to one embodiment.
Figure 10C:
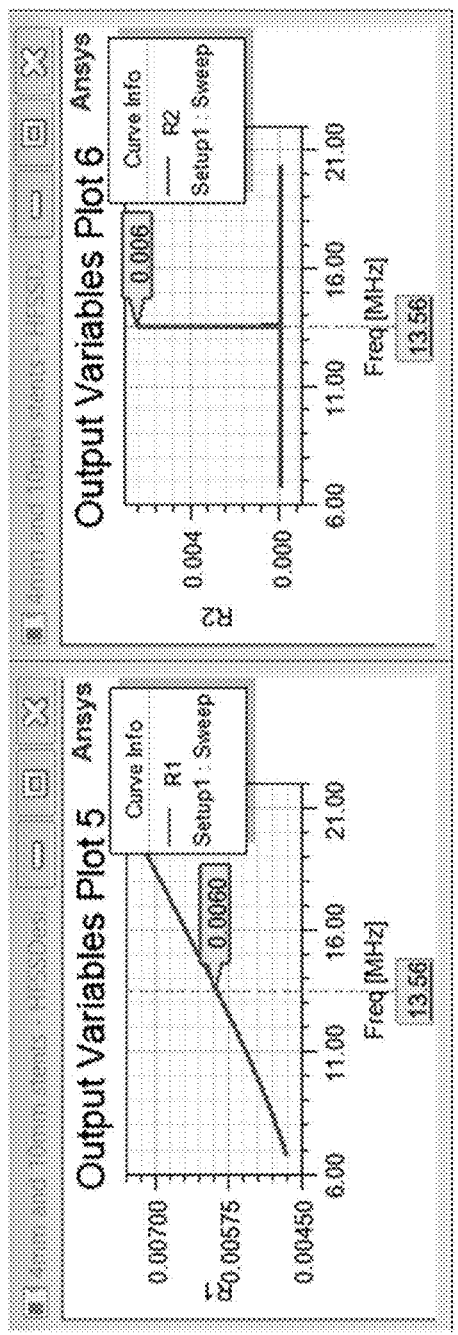
FIG. 10C shows graphs of self-resistance for transmit and receive stents according to one embodiment.
Figure 10D:
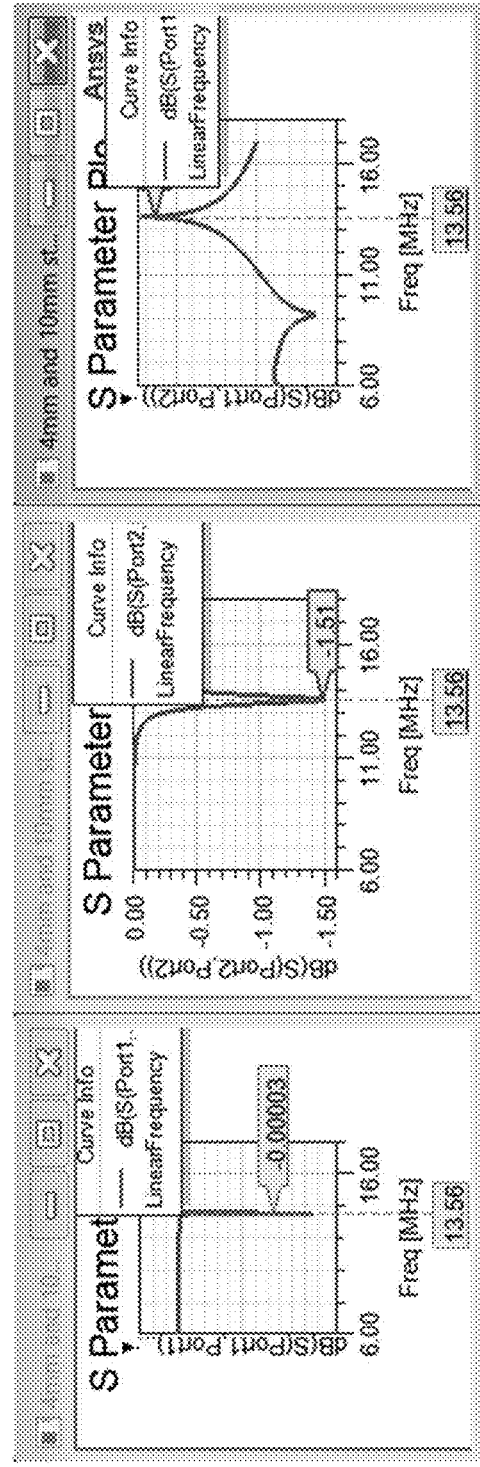
FIG. 10D shows graphs of reflection coefficients S11, S22 and transmission coefficient S12 according to one embodiment.
Figure 11:
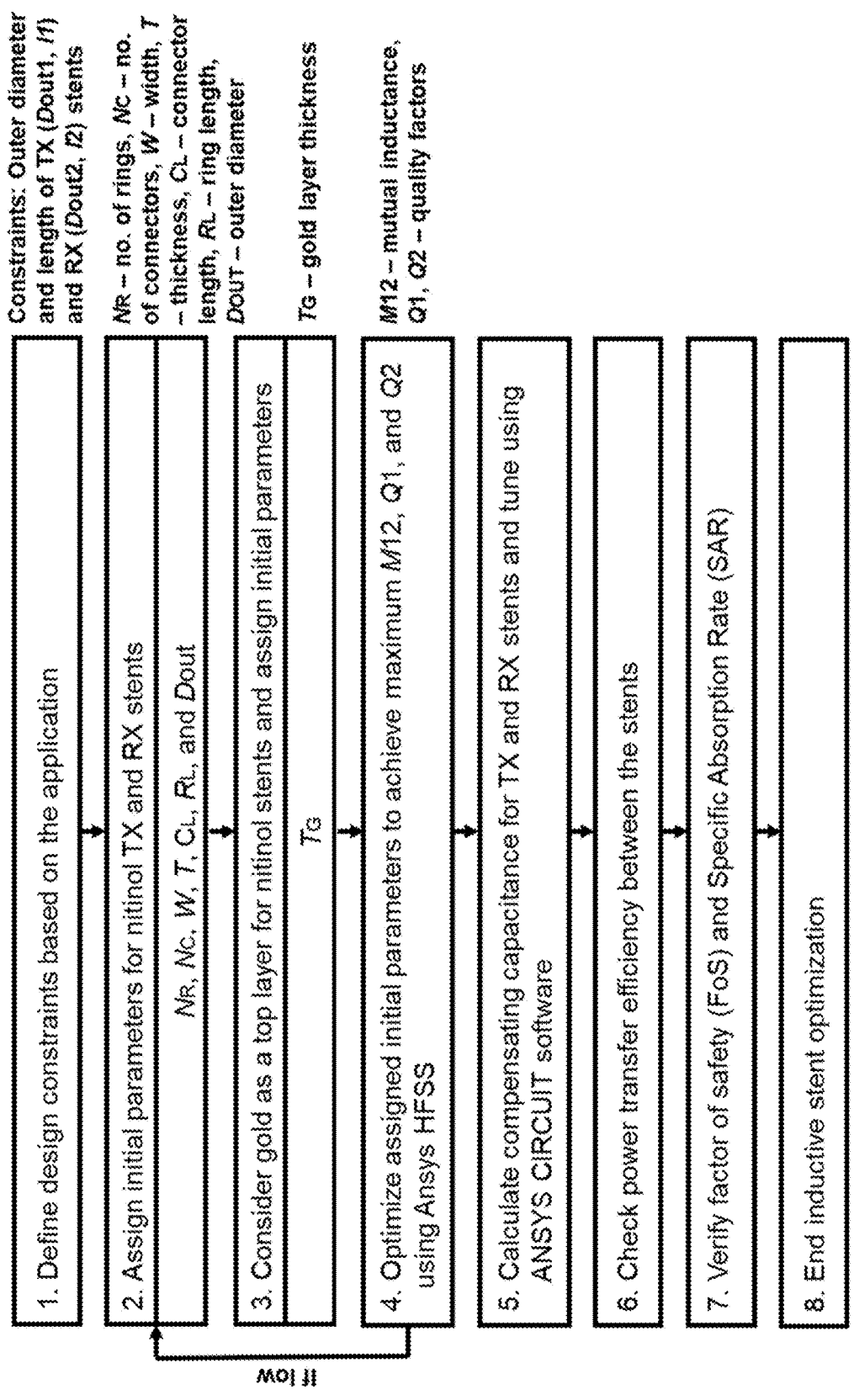
FIG. 11 is a transmit and receive stent optimization flavor chart for maximum power transfer efficiency according to one embodiment.

With reference now to FIGS. 9A and 9B, a transmit (TX) stent and receive (RX) stent are shown according to one embodiment. The transmit stent can have an inner diameter of approximately 10 mm according to one embodiment. A flexible transmit power circuit includes a SMD capacitor, a solid-state battery, oscillator and a power amplifier. The receive stent has an inner diameter of approximately 4 mm according to one embodiment. A flexible receive power circuit includes a rectifier, wireless communication module, SMD capacitor and a battery. Functionality can be similar to embodiments described above. The battery can be repleted by wireless power charging for any back up operation. Corresponding circuit diagrams are shown in FIG. 9C according to one embodiment. FIG. 10A shows the self inductance of the transmit and receive stent resonators. FIG. 10B shows the quality factor of the transmit and receive stent. FIG. 10C shows the self resitance of transmit and receive stents. FIG. 10D demonstrates reflection and transmission coefficients With reference now to FIG. 11, a TX/RX stent optimization flow chart for obtaining maximum power transfer efficiency is shown according to one embodiment. In step 1, design constraints are defined based on the application. In step 2, initial parameters are assigned for nitinol TX and RX stents. In step 3, gold is considered as a top layer for nitinol stents and assigned initial parameters. In step 4, initial parameters are optimized to achieve maximum M12, Q1, and Q2 using Ansys HFSS. In step 5, compensating capacitance is calculated for TX and RX stents and tuned using ANSYS CIRCUIT software. In step 6, the power transfer efficiency is checked between the stents. In step 7, the factor of safety (FoS) and Specific Absorption Rate (SAR) are verified. Step 8 ends the inductive stent optimization.

With reference now to FIGS. 12-24, an inductive stent design methodology is described according to one embodiment.

Figure 12:
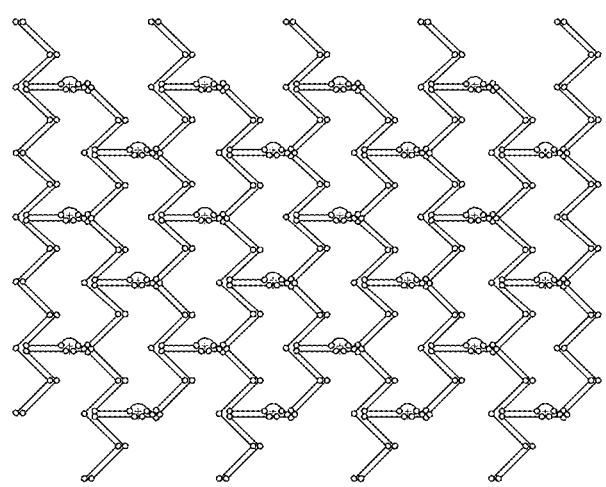
FIG. 12 is diagram showing the full sketch of the design having 9 staggered connected layers according to one embodiment.

Stent Design:

To construct the stent design, two sketches of the outline were created, where one of them represented the odd layers and the other representing the even layers. These layers were staggered and connected at the tips of each layer. The sketch of the 9 staggered layers is shown in FIG. 12.

Figure 13:
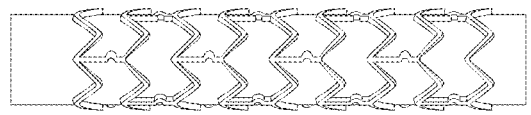
FIG. 13 is a diagram showing the stent sketch of FIG. 12 wrapped onto a cylinder according to one embodiment.

To wrap the sketches, a cylinder was created. This was accomplished by extruding a circle to a large length, in both directions. A cylinder was created that is long enough to wrap the full sketch. The wrap feature is then used to project the sketches around the cylinder, creating the 3D stent. The wrapped design is shown in FIG. 13.

Figure 16:
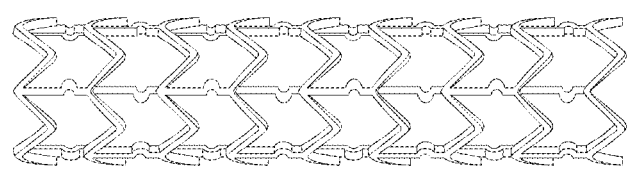
FIG. 16 is a front view of the stent of FIG. 15.
Figure 15:
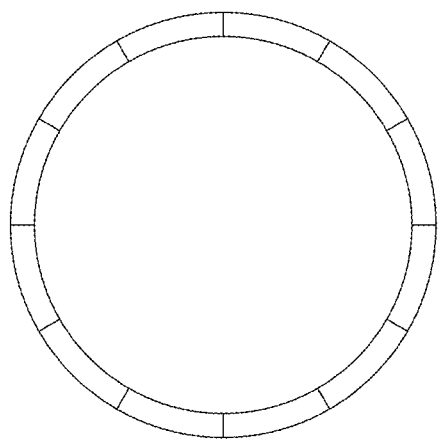
FIG. 15 is a top view of a stent according to one embodiment.
Figure 14:
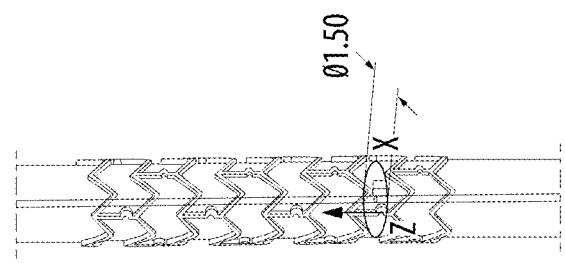
FIG. 14 is a diagram of a cut extrusion setup and showing a cut selection according to one embodiment.

To isolate the stent, the cylinder was hollowed out by using the cut extrude feature. The sketch of the circle used to extrude the cylinder was selected to act as the cut. The length of the cut was in both directions where it was specified as long as the whole cylinder. The setup for the cut extrude is shown in FIG. 14 and the top and front views of the isolated stent are shown in FIGS. 15 and 16 respectively.

Figure 17:
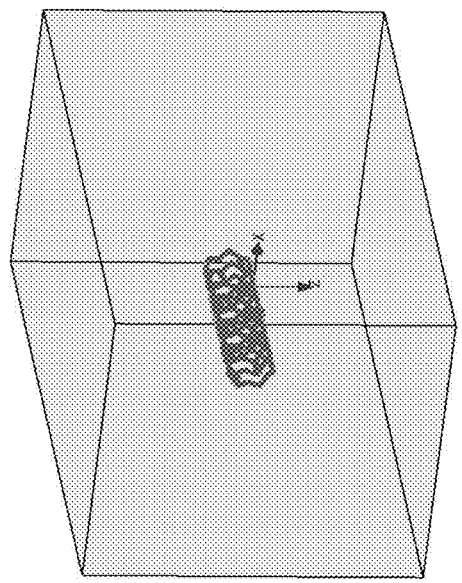
FIG. 17 is a perspective preview view of a stent according to one embodiment.
Figure 18:
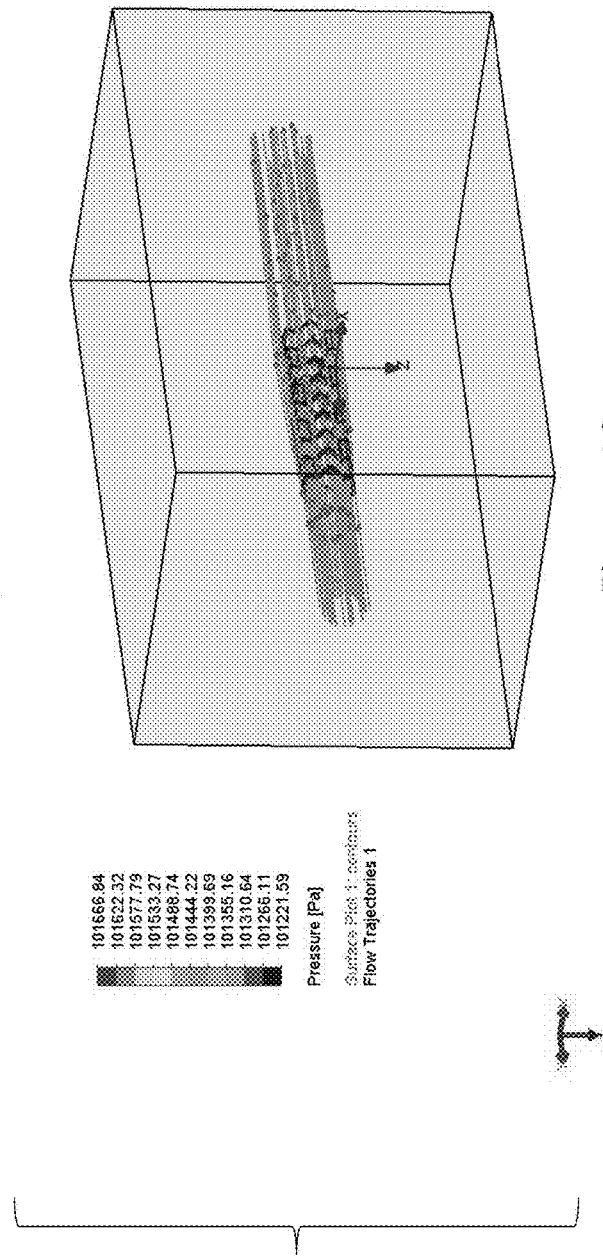
FIG. 18 is a perspective view of a stent and flow trajectory results according to one embodiment.
Figure 21:
FIG. 21 is a perspective view of a stent and stress simulation results according to one embodiment.
Figure 22:
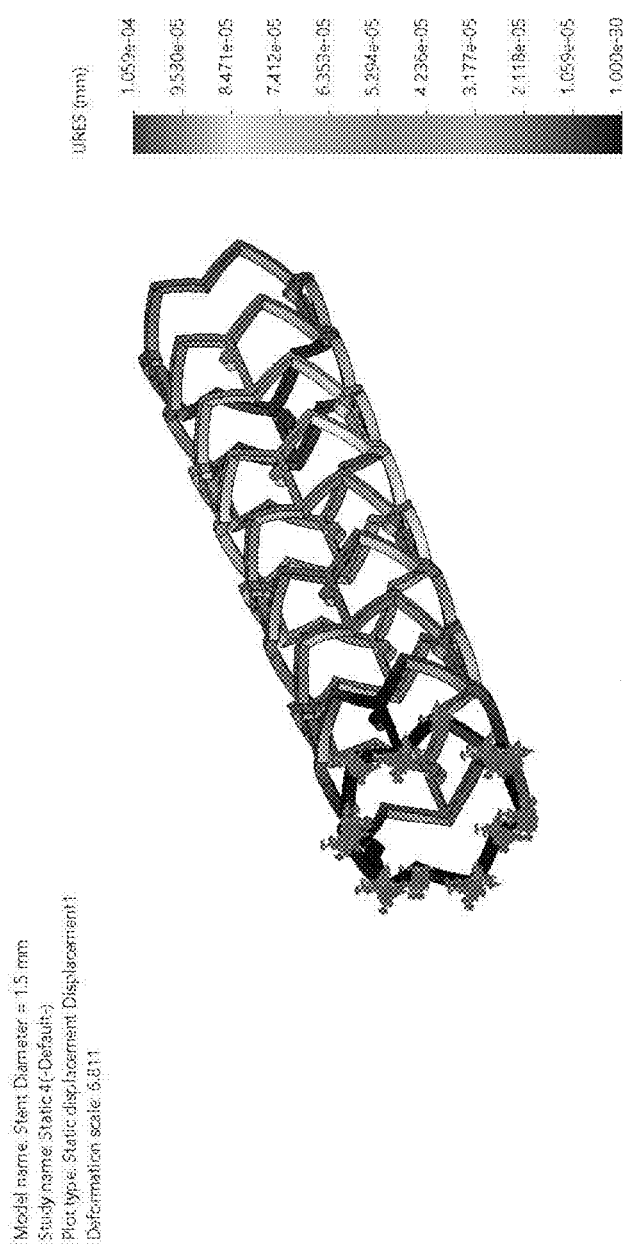
FIG. 22 is a perspective view of a stent and displacement simulation results according to one embodiment.
Figure 23:
FIG. 23 is a perspective view of a stent and stress simulation results according to one embodiment.
Figure 24:
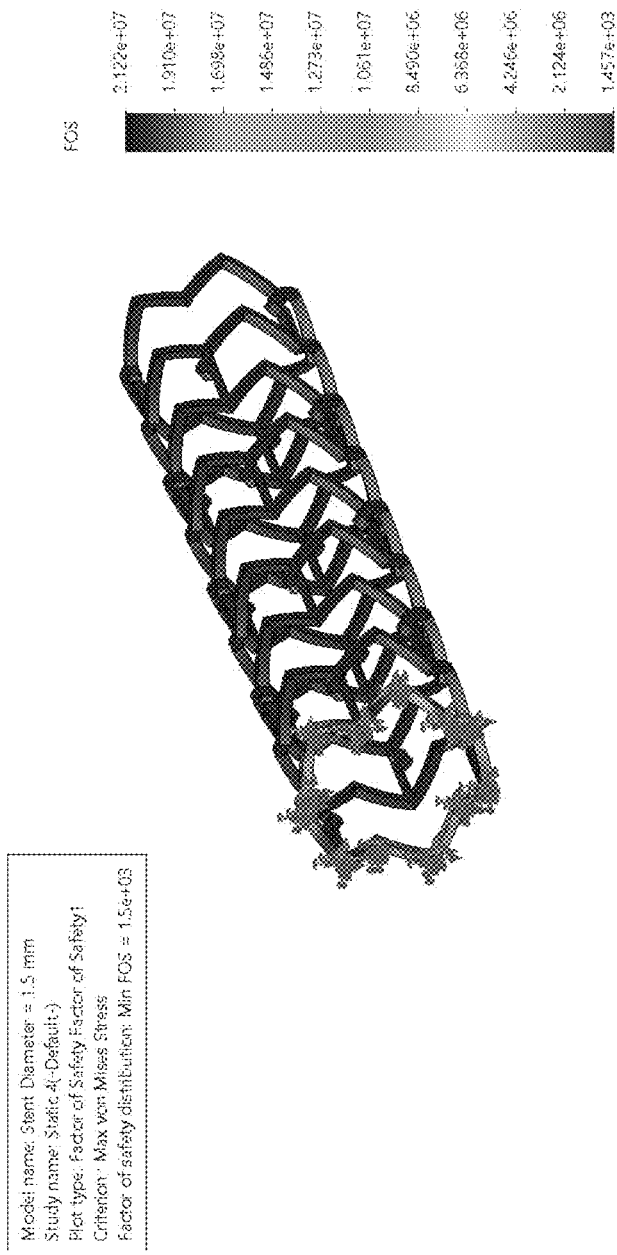
FIG. 24 is a perspective view of a stent and a factor of safety (FOS) plot, the minimum FOS greater than 1 showing high stability.

Flow Simulation:

A flow simulation was performed to simulate the blood flow through the stent. The external flow simulation was set up at 310.15° K., using blood as the fluid, and velocity in the Y-direction was −0.66 m/s. With the previous inputs, the simulation was run, and the mesh was automatically created from the software. The flow trajectories and a pressure distribution were obtained once the simulation was complete. To show the flow trajectories, the entire stent was selected as two faces. As shown in FIG. 17, the number of points inputted was 100 and lines with arrows were selected for the appearance. The result of the setup is shown in FIG. 18.

To get the pressure distribution. A surface plot was inserted. For the selection, all faces were used, and the contour parameter was chosen as pressure. The result is shown in FIG. 19.

Static Simulation:

To determine the stress, displacement, strain, and FOS plots, a static simulation was performed. The results of the flow simulation were used by going to the general settings of the static simulation, flow/thermal effects, and then importing the results of the flow simulation. From importing the flow simulation, the external loads for fluid pressure were predetermined. To perform the static simulation, the top of the stent was used as fixed geometry, shown in FIG. 20. The material, nitinol, was then added to the Solidworks library, and chosen for the simulation. The simulation was run and the stress, displacement, strain, and the factor of safety (FOS) plots were defined and are represented in FIGS. 21-24 respectively. From the plot, the minimum FOS was computed by dividing tensile yield strength by von mises stress and was greater than 1, indicating a structurally stable model.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A leadless multi-site stimulator system, comprising:
   a transmit stimulator device comprising a first radially expandable stent structure, a battery electrically coupled to at least one transmit stimulator electrode, a wireless transmit coil comprising the first radially expandable stent structure, and at least one transmit stimulator electronic circuit configured to generate and transmit a stimulation signal; and
   at least one receive stimulator device comprising a second radially expandable stent structure, at least one receive stimulator electrode, a wireless receive coil comprising the second radially expandable stent structure, and at least one receive stimulator electronic circuit configured to receive the stimulation signal generated from the at least one transmit stimulator electronic circuit.

2. The system of claim 1, wherein the battery, the at least one transmit stimulator electrode, and the at least one transmit stimulator electronic circuit are electrically connected via the wireless transmit coil.

3. The system of claim 1, wherein the wireless transmit coil stent is about 3 cm in diameter and about 2 cm in length.

4. The system of claim 1, wherein the wireless transmit coil stent is self-expanding.

5. The system of claim 1, wherein the battery is flexible.

6. The system of claim 1, wherein the battery is about 9 cm wide, about 3 cm long and about 805 µm thick.

7. The system of claim 1, wherein the first and second radially expandable stent structures include a series of struts.

8. The system of claim 7, wherein the at least one transmit stimulator electrode is disposed at an intersection between the struts of the first radially expandable stent structure, and wherein the at least one receive stimulator electrode is disposed at an intersection between the struts of the at least one second radially expandable stent structure.

9. The system of claim 1, wherein the at least one receive stimulator electrode and the at least one receive stimulator electronic circuit are electrically connected via the wireless receive coil.

10. The system of claim 1, wherein the wireless receive coil stent is about 20 mm in length and 4-6 mm in diameter.

11. The system of claim 1, wherein the wireless receive coil stent is self-expanding.

12. The system of claim 1, wherein the at least one transmit stimulator electronic circuit comprises a transmit stimulation control unit, an accelerometer, a sensing control unit, a sensing electrode, a power control unit, an embedded trace microcell architecture specification (ETMCR) control unit, an amplifier and a transmit tuning circuit.

13. The system of claim 1, wherein the at least one receive stimulator electronic circuit comprises a receive tuning circuit, an AC/DC converter, a receive stimulation control unit, an electrode cathode, and an electrode anode.

14. The system of claim 1, wherein the transmit stimulator device at the least one receive stimulator device are configured to advance into and deploy within an anatomical lumen.

15. The system of claim 1, wherein the stimulation signal comprises at least one of a pacemaking signal, a deep brain stimulation signal, a vagus nerve stimulation signal and a nerve innervation signal.

* * * * *